US007769607B2

(12) United States Patent
Phelps

(10) Patent No.: US 7,769,607 B2
(45) Date of Patent: Aug. 3, 2010

(54) METHOD OF ENHANCING VALUE OF PENSION PLAN ASSETS

(75) Inventor: Robert B. Phelps, New Orleans, LA (US)

(73) Assignee: Indianola Development Company, L.L.C., Baton Rouge, LA (US)

( * ) Notice: Subject to any disclaimer, the term of this patent is extended or adjusted under 35 U.S.C. 154(b) by 416 days.

(21) Appl. No.: 10/636,125

(22) Filed: Aug. 7, 2003

(65) Prior Publication Data

US 2005/0033611 A1  Feb. 10, 2005

(51) Int. Cl.
*G06Q 40/00* (2006.01)
(52) U.S. Cl. ............................... 705/4; 705/36
(58) Field of Classification Search ............ 705/4, 705/36
See application file for complete search history.

(56) References Cited

U.S. PATENT DOCUMENTS

| | | | | |
|---|---|---|---|---|
| 4,969,094 | A | * | 11/1990 | Halley et al. |
| 5,136,502 | A | | 8/1992 | Van Remortel et al. |
| 5,802,500 | A | * | 9/1998 | Ryan et al. ............ 705/36 |
| 5,907,828 | A | * | 5/1999 | Meyer et al. .......... 705/4 |
| 5,974,390 | A | | 10/1999 | Ross |
| 5,991,744 | A | * | 11/1999 | DiCresce ............. 705/36 |
| 6,456,979 | B1 | | 9/2002 | Flagg |
| 6,473,737 | B2 | | 10/2002 | Burke |
| 2002/0035489 | A1 | * | 3/2002 | Herman et al. ........ 705/4 |
| 2002/0198802 | A1 | * | 12/2002 | Koresko ............. 705/35 |
| 2003/0018498 | A1 | * | 1/2003 | Banks ............... 705/4 |
| 2005/0216316 | A1 | * | 9/2005 | Brisbois et al. ........ 705/4 |
| 2006/0080148 | A1 | * | 4/2006 | Koresko ............. 705/2 |

OTHER PUBLICATIONS

Panko, Ron; "Cashing Out"; Life Settlements; Life/Health; Bests Review; Apr. 2002; 4 pages.
Katt, Peter; "A Life Settlement Update; And Life Insurance in Pension Plans"; AAII Journal; May 2003; vol. XXV; No. 4; pp. 33-35.
Savage, Terence; "Life Settlements Require A Complete Underwriting Workup"; National Underwriter; Life & Health/Financial Services Edition; Oct. 28, 2002; 2 pages.
Brooks, Brian et al.; "Clients May Hold Millions in Untapped Insurance Wealth, Study Finds"; Street Talk; On Wall Street; Nov. 2002; pp. 22-24.
Buerger, Alan H.; "Life Settlements Come of Age"; Trusts & Estates; Nov. 2002; 4 pages.

Doherty, Neil A. et al.; "The Benefits of A Secondary Market For Life Insurance Policies"; publication date unknown; 27 pages.
Doherty, Neil A. et al.; "The Benefits of A Secondary Market For Life Insurance Policies"; Real Property, Probate and Trust Journal; vol. 38; No. 3; Fall 2003; pp. 449-478.
De Simone, Marcella; "Life Settlement Association Seeks To Set Up Accountability Standards"; National Underwriter; Sep. 29, 2003; pp. 8 and 10.
Author Unknown; "Measuring Pension Obligations and Determining Pension Plan Costs"; Actuarial Standards Board—Exposure Draft; Dec. 2002; 23 pages.
Higgins, Barry; "Agents Find Opportunities In Life Settlements"; National Underwriter; Sep. 29, 2003; pp. 4-5.
Fullerton, Jolene D.; "Using Life Settlements to Acheive Charitable Giving Goals"; National Underwriter; Sep. 29, 2003; pp. 5-6.
Connolly, Jim; "Life Settlement Proposals Could Affect Viatical Brokers And Contracts"; National Underwriter; Sep. 29, 2003; p. 10.
U.S. Appl. No. 12/383,369, filed Mar. 23. 2009, Phelps.
Byrnes, Nanette, "Sink Hole! How Public Pension Promises are Draining State and City Budgets", Special Report, BusinessWeek, Jun. 13, 2005, pp. 68-72 and 74-76.
Young, Jeffrey E.,"Examining Business Method Patents—Is the 'Technological Arts' Requirement at Odds with State Street and Diehr?", IPL Newsletter, vol. 23, No. 3, Spring 2005, pp. 21-24.
Notice of Allowance for U.S. Appl. No. 11/051,473, mail date of Dec. 1, 2008.

* cited by examiner

*Primary Examiner*—Vanel Frenel
(74) *Attorney, Agent, or Firm*—R. Andrew Patty, II; William T. Ellis

(57) ABSTRACT

A method for increasing the assets of a pension plan is disclosed. The method includes investing at least a portion of one or more assets of a pension plan so as to acquire an interest in one or more current, in-force insurance contracts from one or more owners of the one or more current, in-force insurance contracts. Each of the one or more insurance contracts is either an annuity or a life insurance contract, but in either case, the insured is not a beneficiary of the pension plan. The remaining life expectancy of the insured, or the remaining life expectancy of each of the insureds when multiple contracts are involved, determined at least immediately after the acquisition, should be such that (i) the total value of the pension plan assets, including the interest so acquired, determined immediately after acquisition, is appreciably greater than (ii) the total value of the pension plan assets, exclusive of the interest acquired and inclusive of the assets invested, the total values of (i) and (ii) being determined at the same point in time an according to the same actuarially sound valuation method. Related investment products and pension plans are also disclosed.

9 Claims, No Drawings

METHOD OF ENHANCING VALUE OF PENSION PLAN ASSETS

TECHNICAL FIELD

The present invention pertains to pension plans and methods of funding them.

THE INVENTION

Assets included in one or more specific pension plans administered by pension systems (i.e., the administrative apparatus which controls and manages one or more pension plans) vary by law and policy, but include generally fixed income securities and equities (as individual securities or shares in pools of securities, e.g., mutual funds), cash or cash equivalents, and other permitted investments, e.g., real estate, annuity contracts, life insurance policies and other classes of investments. Valuing the assets included in such retirement plans requires utilization of various methods which depend in whole or in part upon the characteristics of the asset being valued. Valuation methods for securities traded in liquid markets are based on public data. Illiquid securities require independent analysis, e.g., appraisals for real estate. The valuation of assets administered by a pension system (public or private) is further determined by a number of rules-based constraints, such as, e.g., generally accepted accounting treatment (including governmental accounting standards), ERISA under U.S. law, and generally accepted actuarial treatment.

A periodic actuarial task undertaken by all pension systems is an analysis of the status of the system's pension plan(s) as of a point in time which includes an evaluation of two independent components: a) liabilities and b) assets and further includes a calculation of the magnitude of the difference between the assets and liabilities. If liabilities exceed assets, the pension plan has an unfunded actuarial accrued liability ("UAL"). The UAL is one measure of fiscal health, and it measures the difference on a given day between the actuarial asset value and the actuarial accrued liabilities of a given plan. Generally, a pension plan should fund annually a) its normal costs to meet the expected costs of funding future liabilities on a current basis and b) amortize its UAL to make up for the mismatch between assets and liabilities (the "UAL Amortization"). Generally, actuarial value of the liabilities of a plan are determined using generally accepted actuarial treatment of the life expectancy of the pool of beneficiaries and the respective benefits due beneficiary classes from the pension plan. Generally, actuarial value of assets can be valued on the basis of (a) book, (b) market or (c) some other actuarially sound method, including a modification involving either or both. For example, equity assets of a plan are commonly valued at both market value and at actuarial value, which allocates realized and unrealized gains over a smoothing period over two or more years. Actuarial present value analysis also is employed as part of the actuarial asset valuation process. Actuarial present value is the value as of a specific date of an amount or series of amounts payable or receivable thereafter, with each amount adjusted to reflect the time value of money and the probability of payments.

Conventionally, pension plan managers wishing to redeploy assets to increase return were limited to traditional vehicles (e.g., equities and fixed income securities) and their traditional methods of valuation (e.g., book or market) with the attendant market and timing risks. It has been the case that life insurance contracts providing death benefits on the life of beneficiaries of a pension plan have been used to a limited extent in some pension plans and exclusively in other plans (e.g., 412(i) plans in the United States) primarily for beneficial income tax treatment, e.g., under the U.S. Internal Revenue Code, of premiums paid, since some portion of contributions to a pension plan used to pay policy premiums are deductible by the payor at least in the United States. Estate tax and other consequences can make the use of life insurance contracts by a pension plan on pension plan beneficiaries unattractive.

A secondary market in current life insurance policies has developed in the past decade based on evolving legal environment and market requirements. First employed in the viatical arena to enable terminally ill insureds to obtain a portion of the value of their death benefit coverage during life, the sale and purchase of such life insurance contracts (also known as "viatical settlements") in the secondary market has grown steadily. Viatical settlements are regulated in a number of states in the United States. A secondary market also exists for current life insurance contracts on well insureds, which are described as "life settlement" contracts, to distinguish from viatical settlements.

Notwithstanding the ongoing evolution of markets and financial products, pension plans continue to suffer significant fluctuations in value and in fact are increasingly determined to be under-funded during periods of declining market values and stable or rising benefit liabilities. Thus, there exists a significant need for a way to remove some measure of volatility in the actuarially determined status of pension plans by increasing the value of plan assets.

The present invention in fact satisfies this need in a unique and highly facile way by providing, amongst other things, a method which comprises investing at least a portion of one or more assets of a pension plan so as to acquire an interest in one or more current, in-force insurance contracts from one or more owners of the one or more current, in-force insurance contracts, wherein each of the one or more insurance contracts is characterized in that it either (a) provides a plurality of periodic payments during the life of an insured or (b) provides a single death benefit on the life of an insured, but in either case, the insured is not a beneficiary of the pension plan. This particular use of an insurance contract having as the insured someone who is not a beneficiary of the pension plan is believed to be quite unique. The insurance contract(s) employed in this invention will always have the characteristic of providing to a beneficiary (1) a stream of payments, (2) a death benefit, or (3) both 1 and 2, with the payment obligations to the beneficiary being either terminated or triggered by the death of an insured. The remaining life expectancy of the insured or the remaining life expectancy of each of the insureds, when determined at least immediately after the acquisition, is such that (i) the total value of the pension plan assets, inclusive of the interest so acquired, determined immediately after the acquisition, is appreciably greater than (ii) the total value of the pension plan assets, exclusive of the interest so acquired and inclusive of the at least a portion of one or more assets of the pension plan invested, the respective total values of (i) and (ii) being determined at the same point in time and in accordance with the same actuarially sound valuation method.

In another embodiment of this invention, the remaining life expectancy of the insured or the remaining life expectancy of each of the insureds, when determined at any time after the acquisition but prior to the occurrence of death of the insured or of any one of the insureds, as applicable, is such that (i) the total value of the pension plan assets, inclusive of the interest so acquired, determined immediately after the acquisition, is appreciably greater than (ii) the total value of the pension plan assets, exclusive of the interest so acquired and inclusive of the at least a portion of one or more assets of the pension plan invested, the respective total values of (i) and (ii) being determined at the same point in time and in accordance with the same actuarially sound valuation method. As used in this description and the appended claims, the phrase 'actuarially sound valuation method" is intended to mean any method for valuing an asset, which method is in accordance with the standards of the Actuarial Standards Board in existence as of the filing of this disclosure.

Another embodiment of this invention provides a pension plan comprised of an investment portfolio, wherein the investment portfolio is comprised of an interest in one or more current, in-force insurance contracts, wherein each of the one or more insurance contracts is characterized in that it either (a) provides a plurality of periodic payments during the life of an insured or (b) provides a single death benefit on the life of an insured, but in either case, the insured is not a beneficiary of the pension plan.

Yet another embodiment of the present invention provides an investment product marketable to a pension system having pension plan assets to invest. The investment product comprises a transferable interest in a pool of current, in-force insurance contracts, wherein each of the one or more insurance contracts is characterized in that it either (a) provides a plurality of periodic payments during the life of an insured or (b) provides a single death benefit on the life of an insured, but in either case, the insured is not a beneficiary of the pension plan.

These and other embodiments, objects, advantages, and features of this invention will be apparent from the following detailed description and appended claims

DETAILED DESCRIPTION OF THE INVENTION

It will now be appreciated that the present invention creates predictable and beneficial results to the acquiring pension plan in a unique way. Typically, the investment of pension assets made when practicing methods of this invention will include a financial mechanism to meet all future premium obligations (a "premium reserve") to provide for payment of costs of keeping the contract(s) enforceable. The premium reserve may constitute part of the acquisition price or may be established independently. Also, it is preferred that the insureds on the life insurances contracts be relatively healthy and elderly (i.e., typically at least 50 years of age, preferably at least 60 years of age, and more preferably at least 65 years of age). The term "healthy" when used in this description and the appended claims means not chronically or terminally ill, where chronically ill means a) being unable to perform at least two activities of daily living (i.e., eating, toileting, transferring, bathing, dressing or continence) or b) requiring substantial supervision to protect the individual from threats to health and safety due to severe cognitive impairment, and terminally ill means having an illness or sickness that can reasonably be expected to result in death in twenty-four months or less.

The remaining life expectancy of the insured, or of at least one of the insureds, under the one or more insurance contracts employed in preferred embodiments of this invention will be no more than about 20 years, and more preferably no more than about 15 years. Even more preferably when dealing with interests in pools of the relevant insurance contracts, the life expectancy of at least a majority of the insureds will be no more than 20 years, and most preferably no more than 15 years.

Pension system practicing the present invention will preferably establish a criteria profile for current insurance policies, or for current interests in pools of insurance policies, to be acquired. For example, a preferred profile would typically limit the acquired contracts or interests to those priced at an acquisition cost below a target percentage of the present value of the payment stream (for an annuity or pool of annuities) or below a target percentage of the death benefit (for a life insurance contract) or total death benefits (for a pool of life insurance contracts), taking into account the purchase price and premium reserve which might be established, as applicable. The contracts sought will be typically only those which are transferable, either by law or by their own terms, and appropriate proof of validity of transfer will be included in the contract acquisition documentation. The contracts sought will be acquired in a diverse manner such that there will be no relative concentration of dollar value amount attributable to a single insured or carrier. In the case of life insurance contracts, the present invention provides the added benefits of third party underwriting of the health risk of the insureds, and provides legal title, lien clearance, and defense waiver and other protections by giving insurance carrier and beneficiary recognition of ownership transfer. Other benefits include the use of third party servicers to hold any premium reserve and to service premium payment obligations which will have been expressly quantified in the contract at time of acquisition.

Thus, in practicing the present invention, pension systems or others will preferably engage in a method comprising (1) establishing a criteria profile for acquired life insurance policies, (2) establishing one or more contractual agreements with providers of necessary services to accomplish acquisition of the policies, such providers including, e.g., policy acquisition agents, insured health screeners/underwriters, escrow agents, and independent actuaries, amongst others, and (3) establishing contractual agreements with providers of necessary services to maintain enforceability of acquired policies. Such necessary services may include, e.g., matching the premium payment schedule of each discrete contract to escrow agent instructions for payment, monitoring receipt of premium payments by carriers, monitoring health of insured (s), processing death benefit claims, and the like. Once these steps have been carried out, in no particular order, the pension systems preferably will then (1) acquire (a) individual policies or (b) pools of policies to diversify carrier risk and to diversify insured risk, and (2) establish and manage corporate or trust entities to hold and administer qualifying acquired policies, or pools of qualifying acquired policies, for the benefit of single or multiple pension plans.

Practicing this method will provide an immediate benefit by increasing the aggregate value of assets in a pension plan, the consequence of which is the positive impact on pension plan assets and any UAL, and the corresponding reduction in the requirement to make any annual UAL Amortization. Practicing this method on a regular disciplined basis over time will provide the ongoing benefit of accelerating the reduction of any UAL and reducing any corresponding annual UAL Amortization. An exemplary scenario will now be presented to illustrate, in a non-limiting way, how a preferred embodiment of this invention may be employed.

EXAMPLE

For life settlement contracts meeting the criteria of a preferred method of this invention, the following ratio will apply:

$$\$B > \$V > \$C.$$

wherein, for each conforming life insurance contract, $B is the death benefit, $V is the actuarial present value and equals the sum of the amounts calculated for every out year through the final year of an actuarial table appropriate to the respective insured, wherein each amount calculated for every out year comprises the present value, at an appropriate interest rate, of the product of the probability that the insured will die during such out year multiplied by the death benefit $B, all in accordance with generally accepted actuarial practices; and $C is the life settlement contract purchase price and equals the amount required to acquire a contract, being the sum of the life settlement contract sale price including transaction costs and the costs of a premium reserve, if any. Immediately after a pension system uses the invention's method to acquire a conforming contract at $C, the valuation of the contract in accordance with generally accepted actuarial practices will cause the value of the contract to increase to $V. $V will further increase at each valuation period as the probability of the insured's death in each out year increases (interest rates remaining constant). The increase at each valuation period of $V (interest rates remaining constant) will only be interrupted by the occurrence of the death of the insured during a period, and the concurrent payment of the death benefit $B to the pension system, thereby converting the value of the contract asset to $B, an amount always greater than $V. A change in the interest rate used to calculate present value will affect valuation results, but will be balanced to a degree in each pension plan by the opposite effect on the value of other assets held by the pension plan.

Terms used in this description and the appended claims, which terms are not otherwise specifically defined in this description, shall have their ordinary and customary meaning as understood by one of ordinary skill in the art when read in the context of this disclosure.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

The invention claimed is:

1. A method which comprises:
   investing at least a portion of one or more assets of a pension plan so as to acquire an ownership interest in a selected plurality of current, in-force life settlement contracts sold by owners of the current, in-force life settlement contracts, wherein each of the plurality of current, in-force life settlement contracts is characterized in that it either (a) provides a plurality of periodic payments during a life of an insured or (b) provides a single death benefit on the life of the insured, and is selected so that the insured is not a beneficiary of the pension plan, and is selected so that a respective remaining life expectancy of each of the respective insureds is within a predetermined limit;
   calculating, by a computing apparatus, periodically for each of a plurality of the respective life settlement contracts, an actuarial present value for every out year through a final year of an actuarial table appropriate to a respective insured of the respective life settlement contract, with parameters for the calculating comprising: a probability that the respective insured will die during such year, an interest rate, and a death benefit for the respective life settlement contract;
   summing, by the computing apparatus, the actuarial present value for every out year through the final year of the actuarial table appropriate to the respective insured, to obtain an actuarial present value for the respective life settlement contract;
   determining, by the computing apparatus, a total value of pension plan assets, including the actuarial present value of the plurality of life settlement contracts, with the total value of the pension plan assets inclusive of the ownership interest in the selected plurality of current, in-force life settlement contracts so acquired converting a value of the assets of the pension plan used to acquire the ownership interest in the selected plurality of current, in-force life settlement contracts into an actuarial present value of the ownership interest in the selected plurality of current, in-force life settlement contracts;
   calculating, by the computing apparatus, a difference between the total value of the pension plan assets and liabilities of the pension plan to obtain an unfunded actuarial accrued liability; and
   maintaining enforceability of the selected plurality of current, in-force life settlement contracts and processing death benefits arising from the life settlement contracts.

2. A method according to claim 1, wherein each of the one or more life settlement contracts is characterized in that it provides a single death benefit on the life of an insured.

3. A method according to claim 2, wherein the remaining life expectancy of the insureds under the life settlement contracts is no mare than 20 years.

4. A method according to claim 3, wherein the remaining life expectancy of the insureds under the life settlement contracts is no more than 15 years.

5. The method according to claim 1, wherein the investing step comprises investing in an ownership interest in a pool of current, in-force life settlement contracts.

6. The method according to claim 5, wherein the pool of current, in-force life settlement contracts are life settlement contracts obtained and made available for acquisition by a third party and wherein the third party maintains or has maintained the enforceability of the selected plurality of current, in-force life settlement contracts and processes or has processed death benefits arising from the life settlement contracts.

7. The method according to claim 1, further comprising:
   setting a selection criterion for the selected plurality of current, in-force life settlement contracts that there will be no relative concentration of dollar value amount attributable to a single insurer or carrier.

8. The method according to claim 1, further comprising:
   administering the pension plan on an approximately regular basis to perform the investing and calculating steps to thereby reduce an unfunded actuarial accrued liability (UAL) and/or reduce any corresponding UAL amortization.

9. The method according to claim 1, wherein one of the steps of claim 1 is performed by a third party.

* * * * *